Patented Oct. 21, 1924.

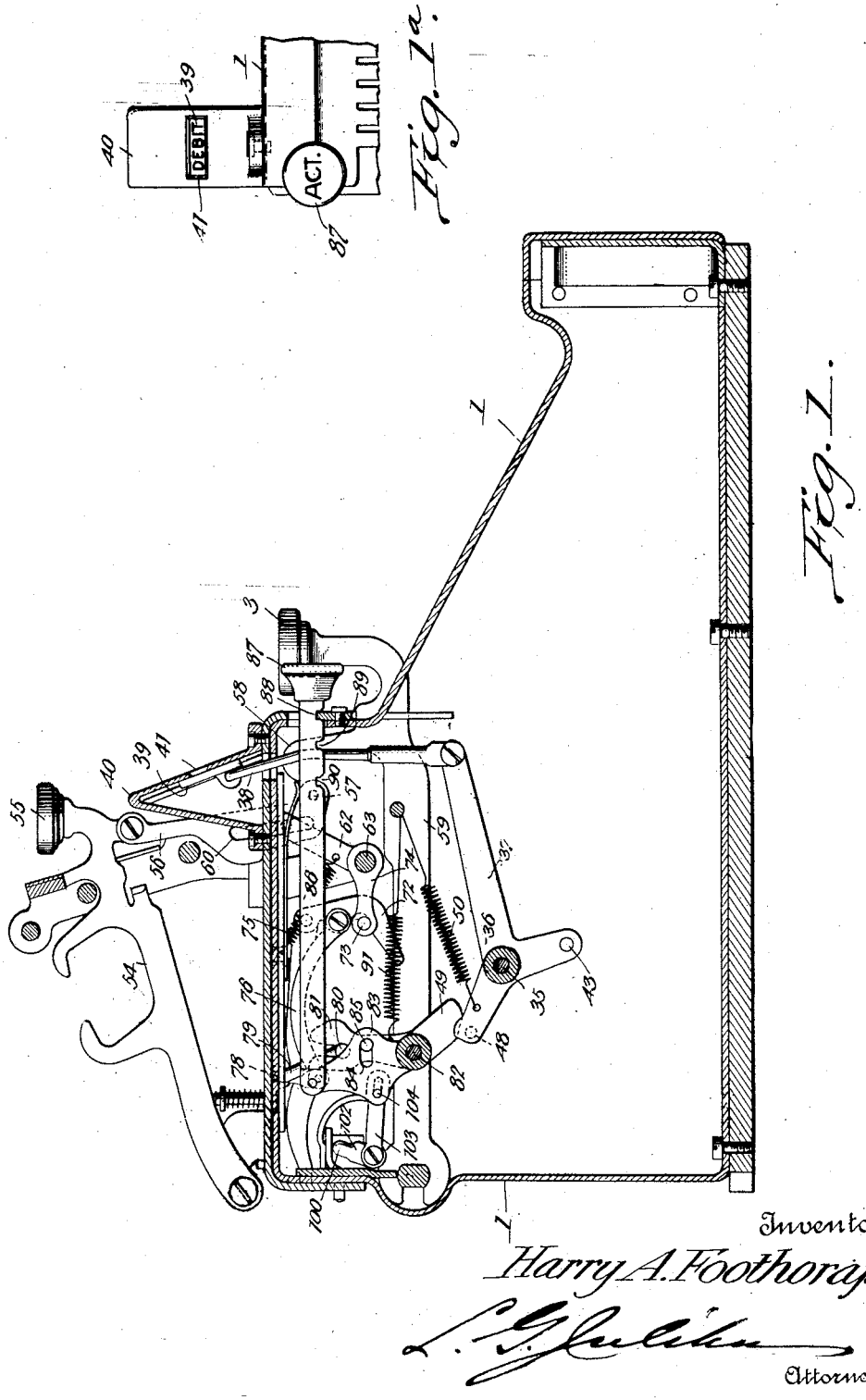

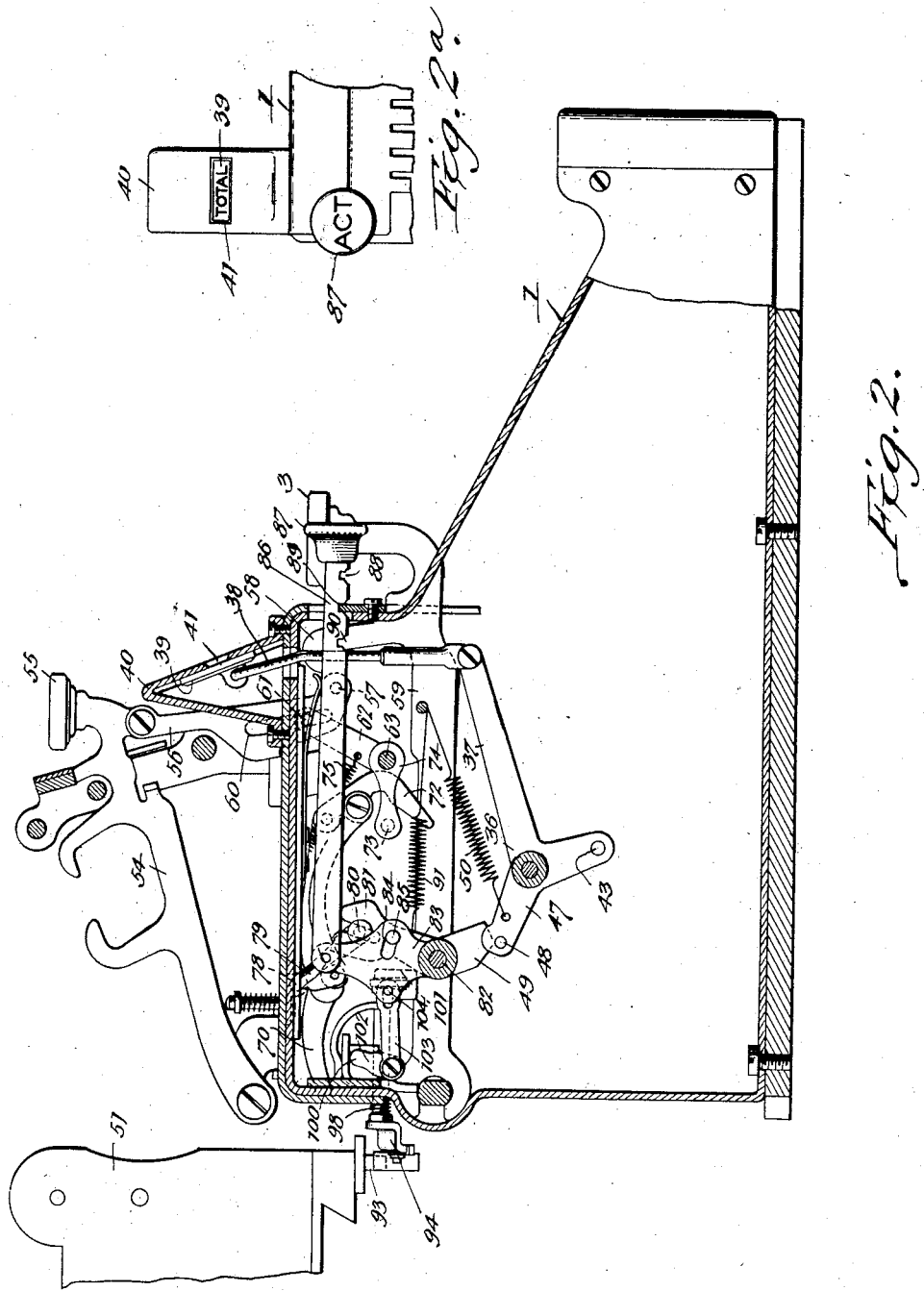

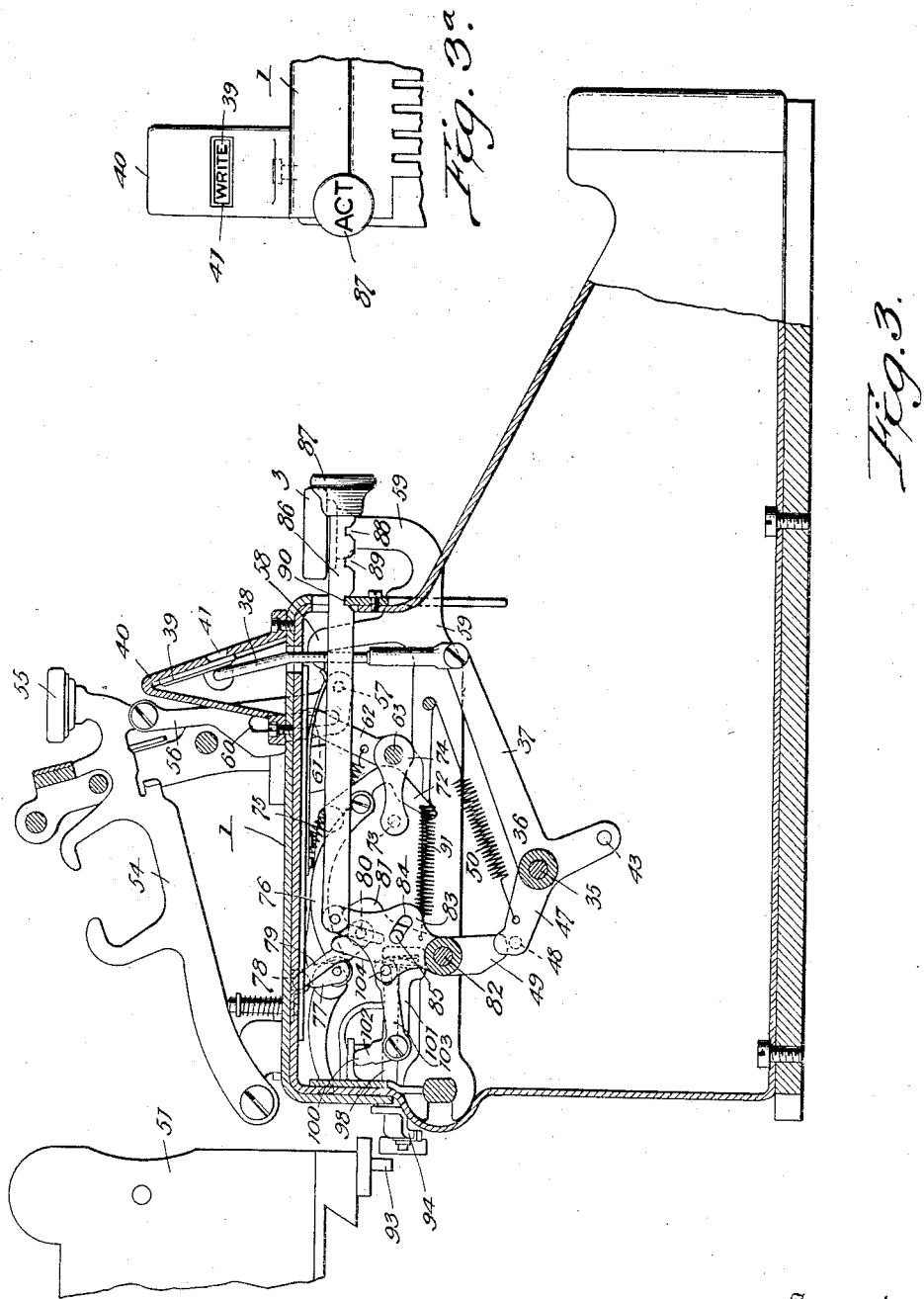

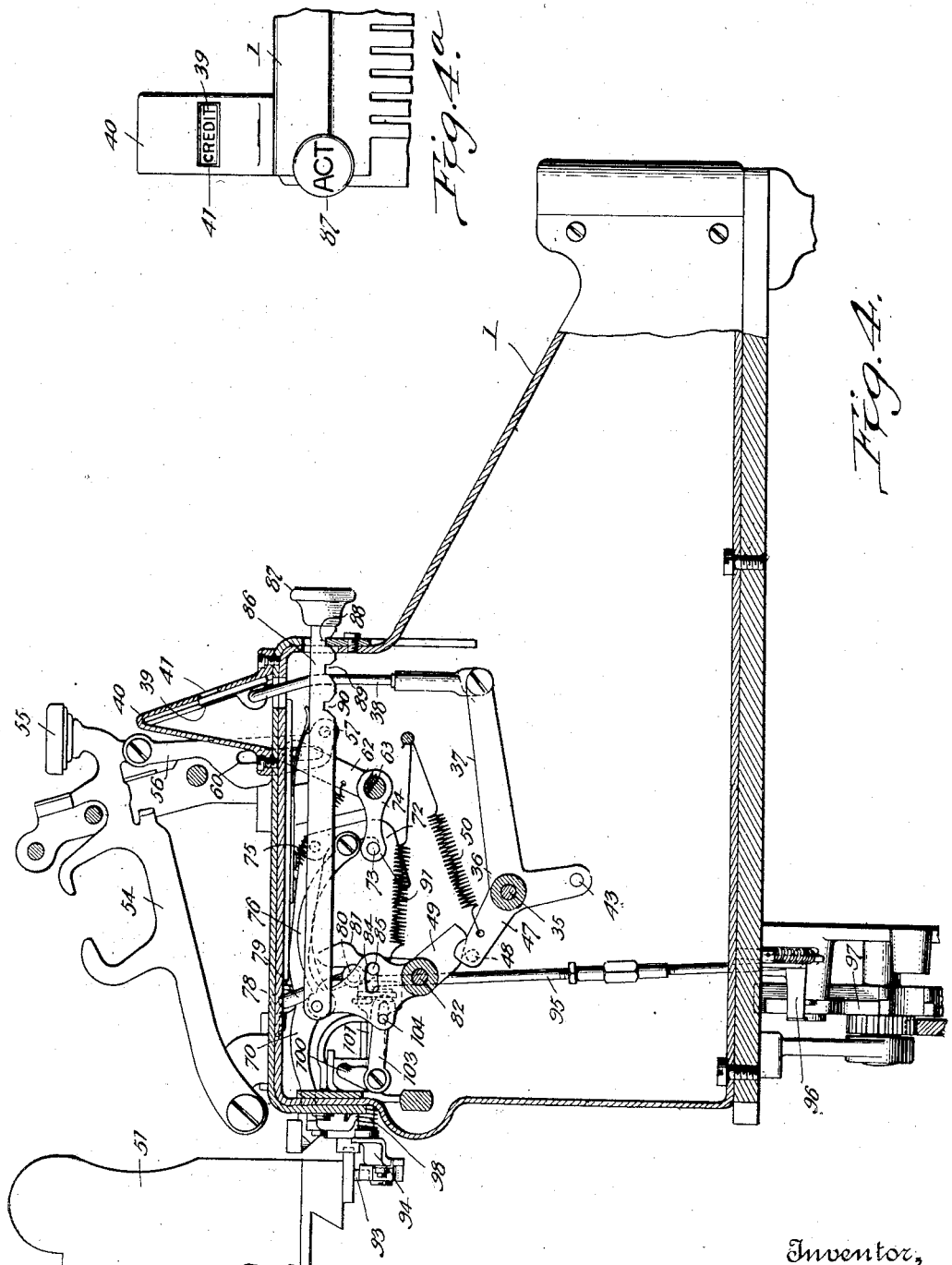

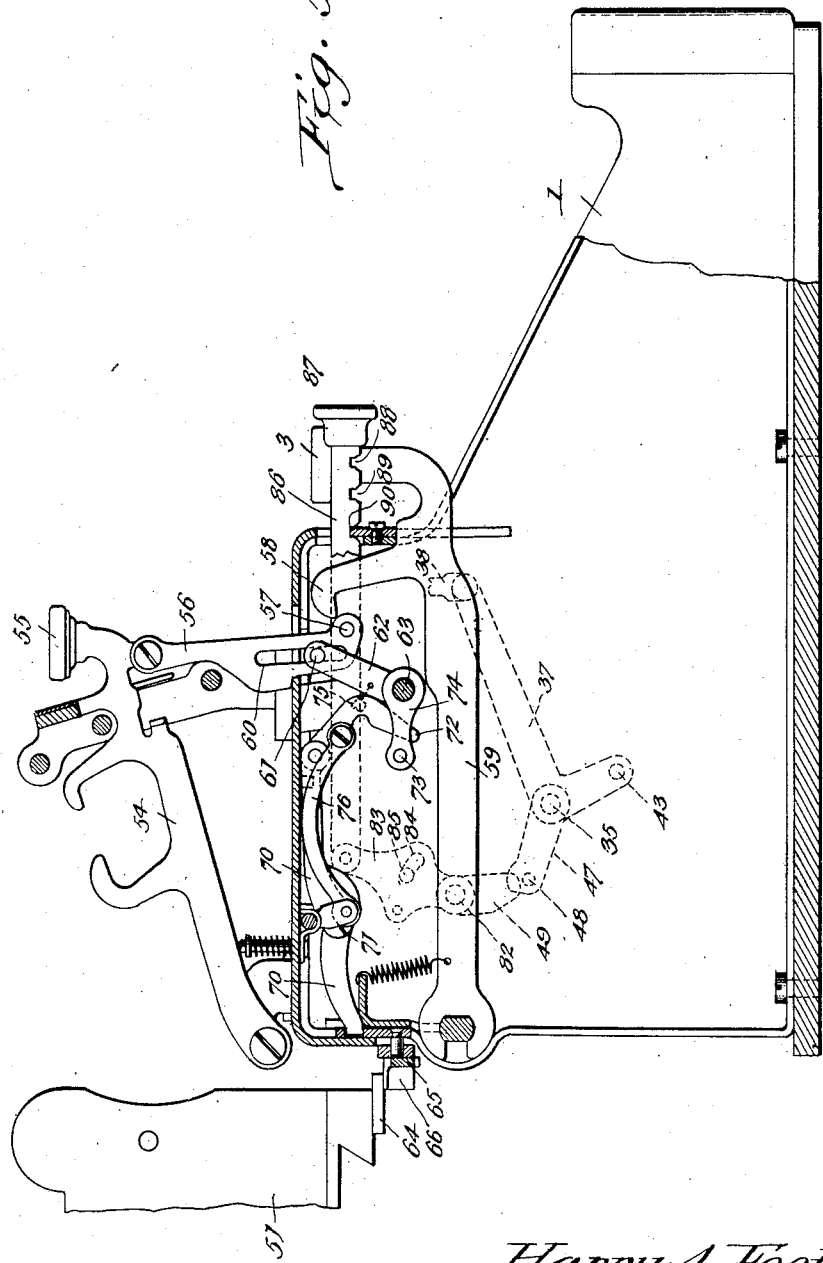

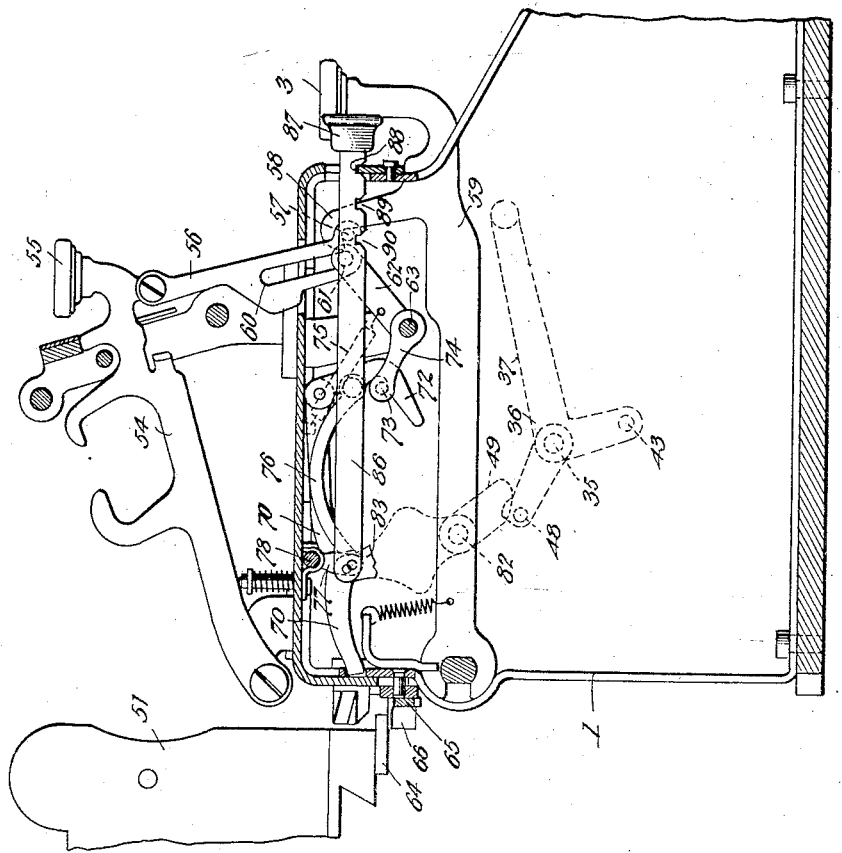
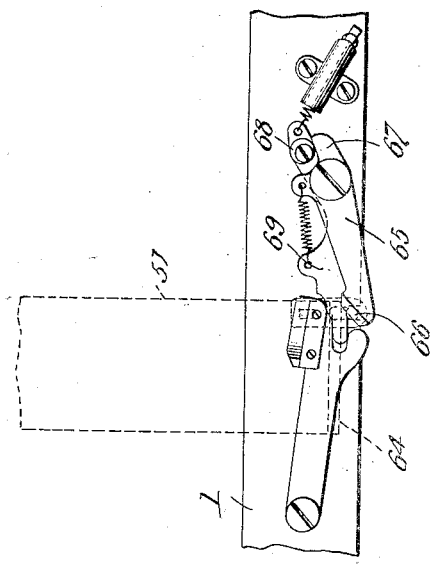

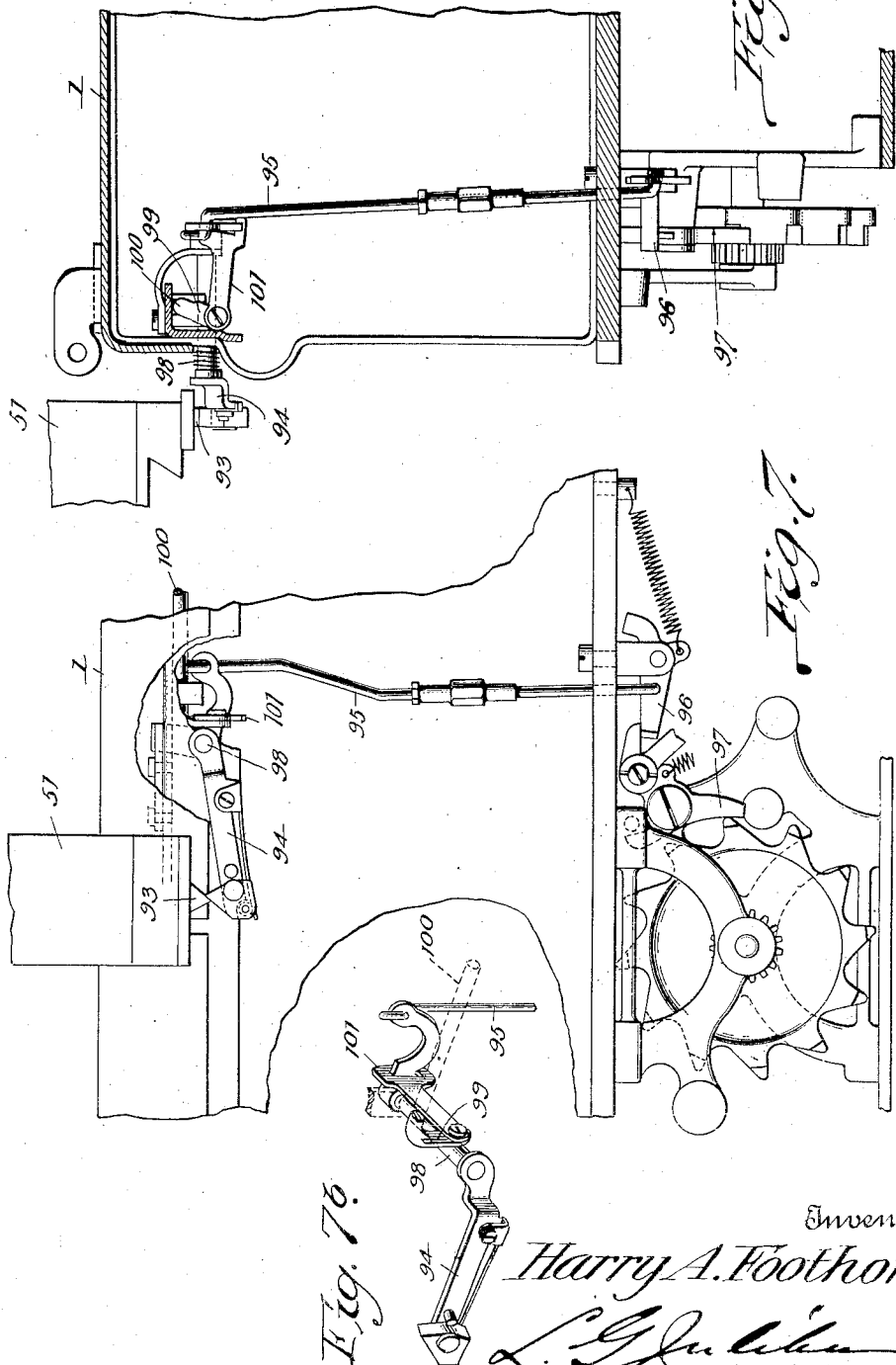

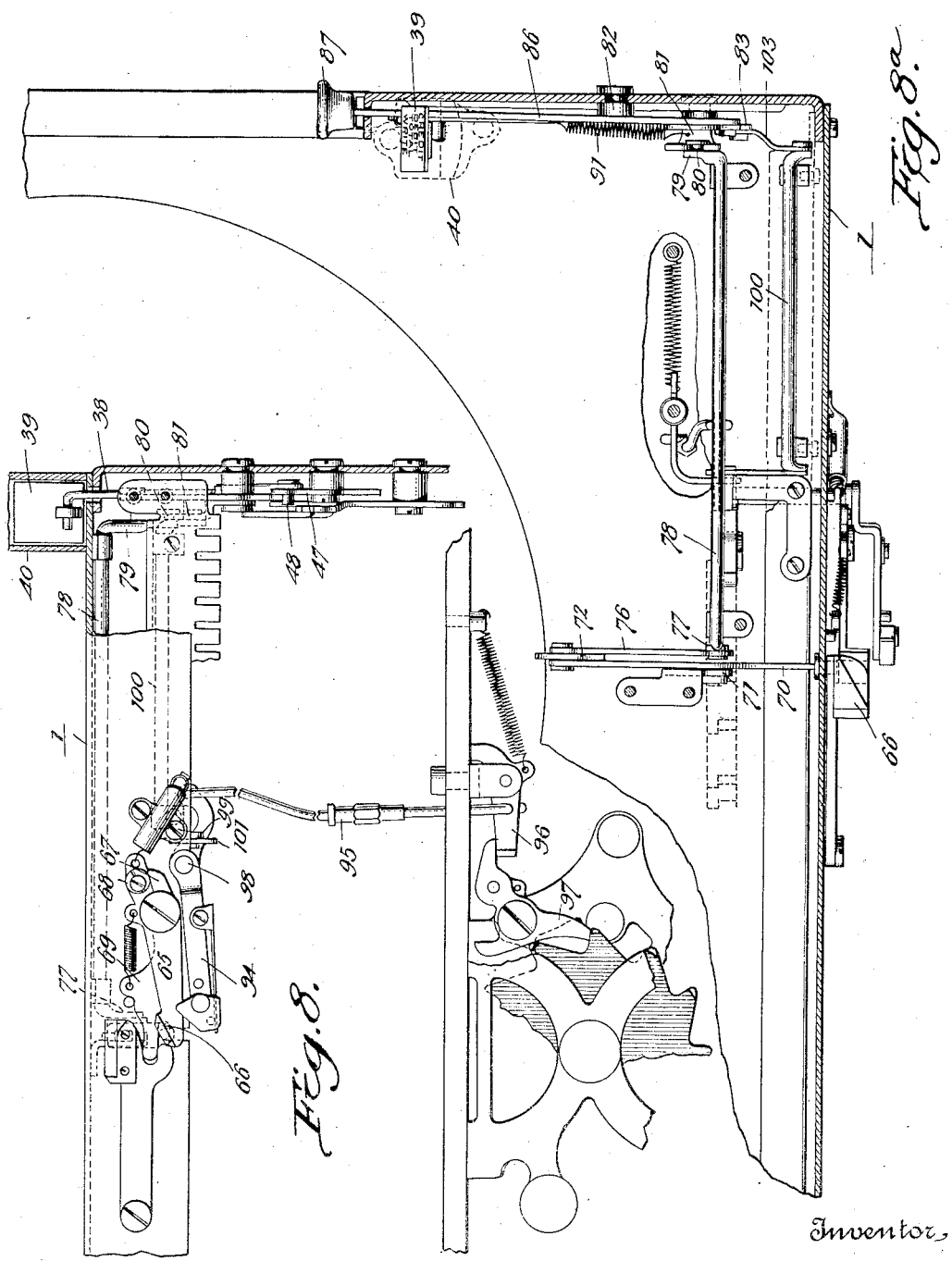

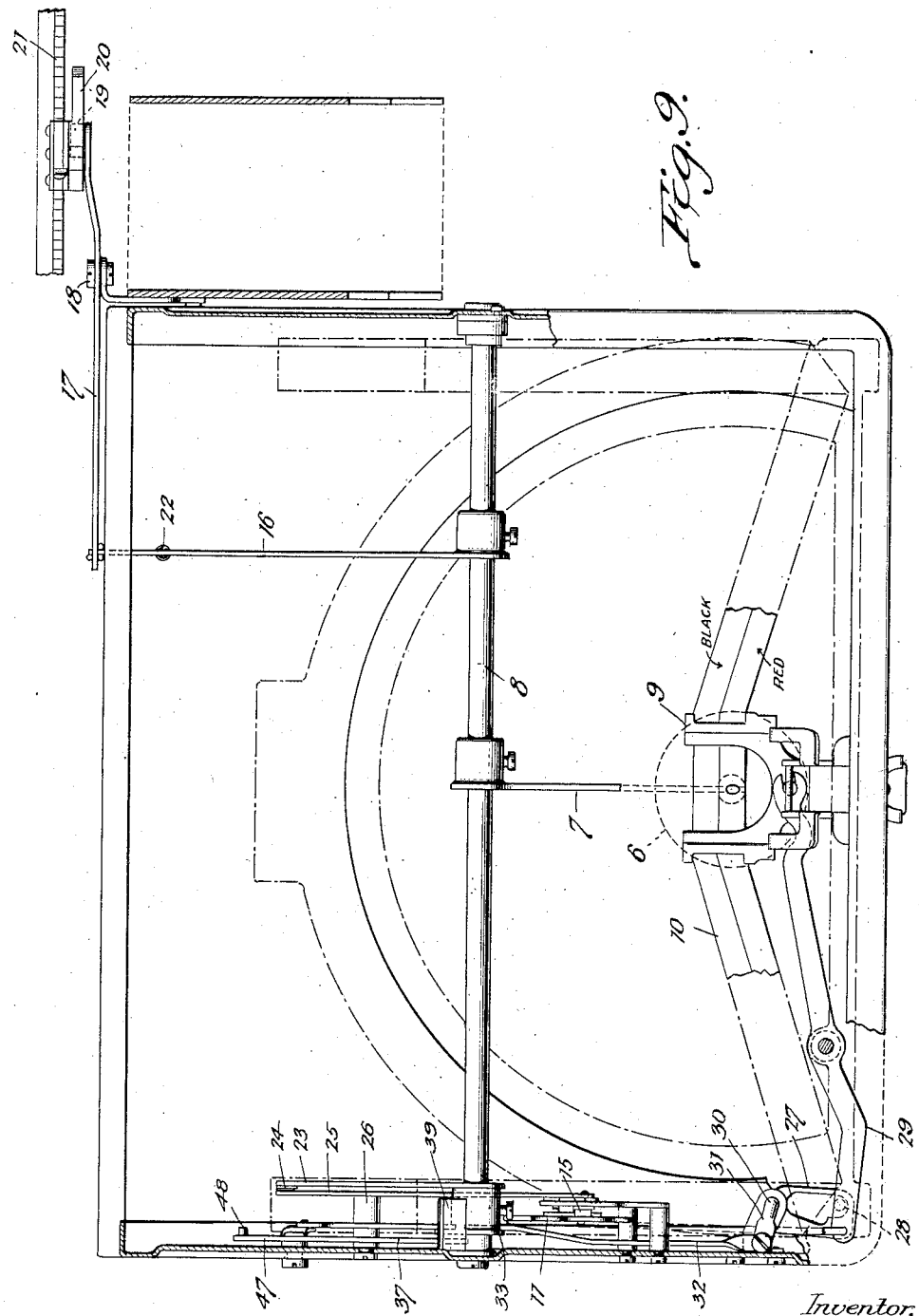

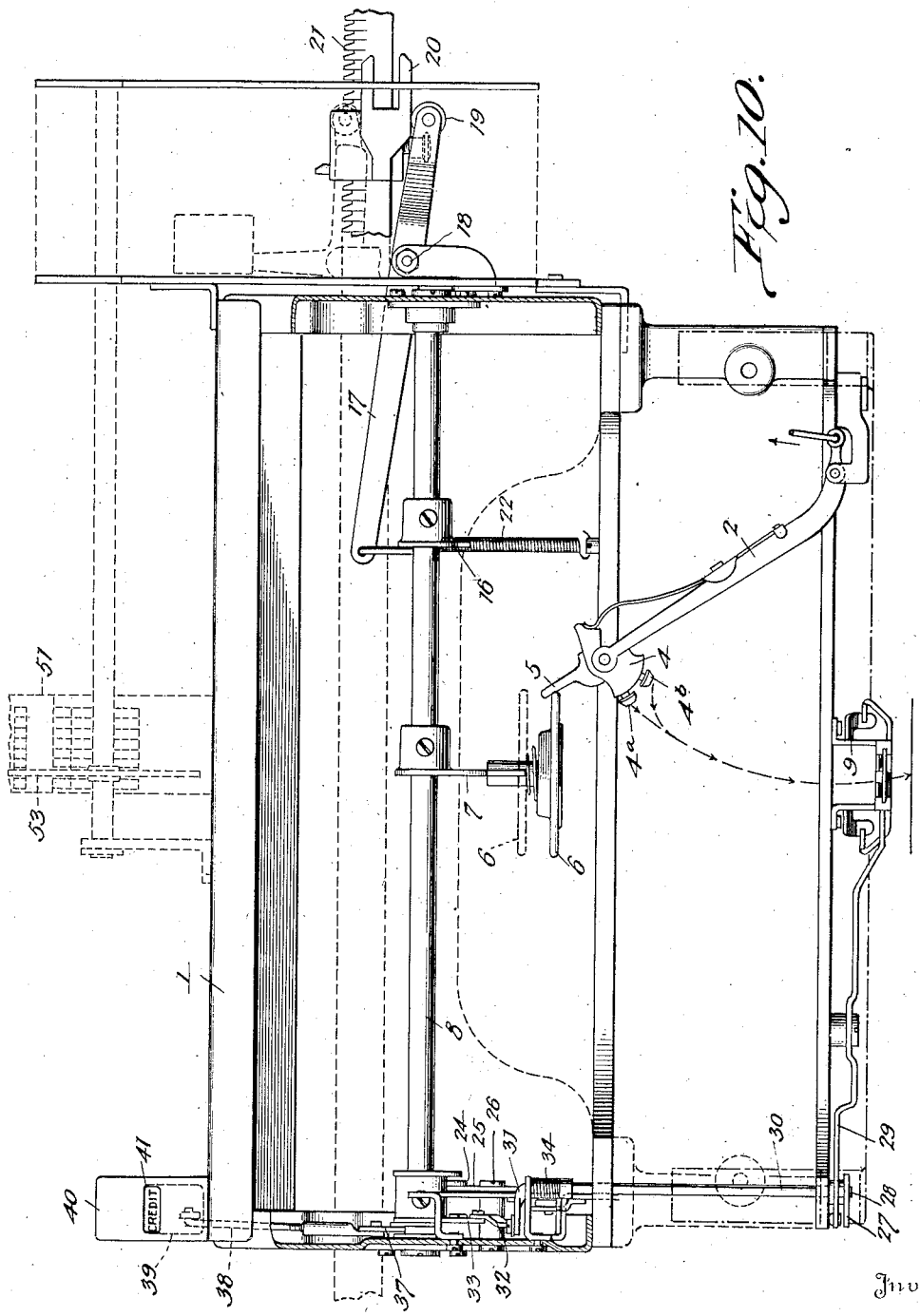

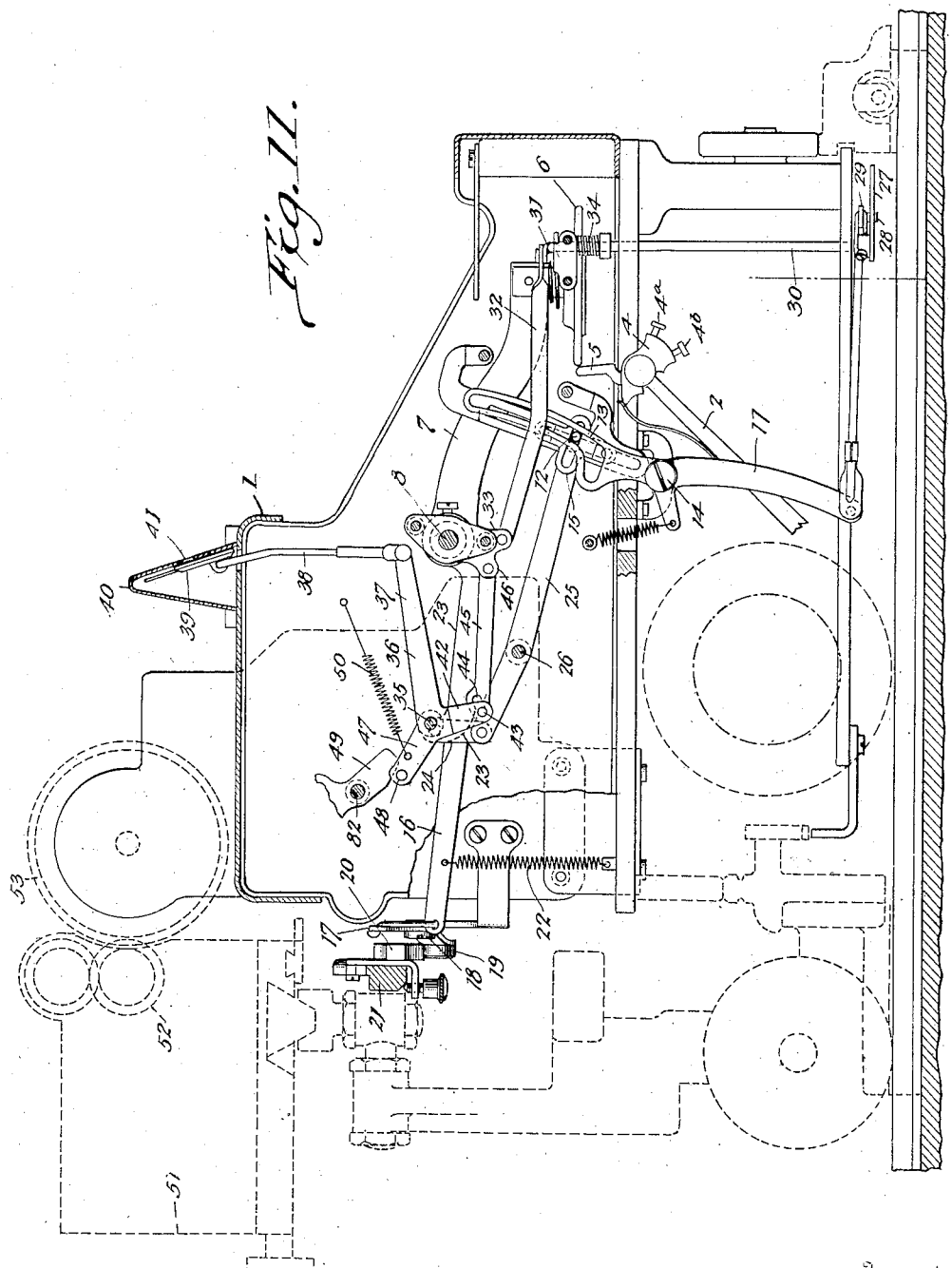

1,512,282

UNITED STATES PATENT OFFICE.

HARRY ARTHUR FOOTHORAP, OF HARRISBURG, PENNSYLVANIA, ASSIGNOR TO ELLIOTT-FISHER COMPANY, A CORPORATION OF DELAWARE.

AUTOMATIC TYPE AND RIBBON SELECTING MECHANISM AND CONTROL FOR WRITING-ADDING MACHINES.

Application filed December 31, 1920. Serial No. 434,248.

*To all whom it may concern:*

Be it known that HARRY A. FOOTHORAP, a citizen of the United States, residing at Harrisburg, in the county of Dauphin and State of Pennsylvania, has invented certain new and useful Improvements in Automatic Type and Ribbon Selecting Mechanism and Control for Writing-Adding Machines, of which the following is a specification, reference being had therein to the accompanying drawing.

My present invention relates to combined writing adding machines, and more particularly that type known to commerce as the Elliott-Fisher machine.

The object of the invention is to combine an automatic color selecting mechanism with a setting or control device which determines and automatically indicates the condition of the machine for the proper performance of its several functions. More specifically stated, the object of the invention is to equip the machine with an automatic ribbon controlling device which selects the color in which the record is to be printed, as for instance, black for debits and red for credits and a setting device which, when set in one of several positions will cause the adding mechanism to be brought into action at the proper time for the addition of debits and credits printed in black and red or placed entirely out of action when the independent use of the writing mechanism is desired, and to vary the decimal trip mechanism accordingly as the machine is used for writing and adding or writing alone.

A further object is to provide an indicator which will with certainty indicate the character of operation contemplated by a given set condition of the machine.

A still further object of the invention is to provide with the automatic ribbon selecting mechanism an automatic type selecting mechanism which will automatically select different characters to be printed in red and black respectively.

In the accompanying drawings:

Figure 1 is a sectional view through the carriage of an Elliott-Fisher machine showing my invention applied thereto, with the control key in the debit position.

Figure 1ᴬ is an elevation of a portion of the machine showing the control key and the indicator.

Figure 2 is a view similar to Figure 1 with the control key in the second or total position.

Figure 2ᴬ is a detailed view similar to Figure 1ᴬ.

Figure 3 is a view similar to Figures 1 and 2 with the control key in the third or writing position.

Figure 3ᴬ is a detail similar to Figures 1ᴬ and 2ᴬ.

Figure 4 is a sectional view of the machine showing the control key in debit position, but with the indicator shifted to the credit position by the automatic operation of the color and type selecting mechanism.

Figure 4ᴬ is a detail.

Figure 5 is a view generally similar to Figure 3 showing the positions assumed by parts of the key connecting mechanism when the control key is set for writing and the connecting arm moves under the depressor plate.

Figure 6 is a view similar to Figure 5 showing the parts in the positions assumed when the key connecting arm moves down as in Figure 5, but with the control key set in the first position.

Figure 6ᴬ is a detailed view of the key connecting arm.

Figure 7 is a rear elevation of a portion of the machine showing more particularly the decimal trip mechanism.

Figure 7ᴬ is a sectional view viewing the decimal trip mechanism at right angles to Figure 7.

Figure 7ᴮ is a detailed perspective view of parts of the decimal trip mechanism.

Figure 8 is a rear elevation, partly in section, showing the decimal trip mechanism and the control or setting mechanism therefor.

Figure 8ᴬ is a plan view of the subject-matter illustrated in Figure 8.

Figure 9 is a sectional view through a portion of the machine showing in plan the mechanism for automatically selecting the type and the color stripe of the ribbon appropriate thereto.

Figure 10 is a front elevation of the mechanism disclosed in Figure 9.

Figure 11 is a side elevation of the same mechanism.

It may be stated by way of premise that the subject matter of my invention is shown applied to what is known in the art as an Elliott-Fisher billing machine, which includes in its organization a flat platen, upon which the work sheet is held in a flat spread-out condition to receive a typewritten record imprinted thereon by printing mechanism which moves laterally of the platen for letter spacing and longitudinally of the platen for line spacing.

This printing mechanism is mounted on a laterally traveling carriage, which is in turn supported by a line space frame which moves longitudinally of the platen. The printing mechanism is of the usual type arm and key class, as will be obvious by reference to Fig. 10 of the drawings.

The movement of the carriage relative to the line space frame is utilized in this class of machines for both the denominational selection of digits printed in different denominational positions and the denominational selection of number wheels or denominational members of an adding mechanism or register. Any number of these registers may be employed and they are mounted on the line space frame and, therefore, normally fixed in relation to the movable carriage which supports a master wheel operated through intermediate connections by the keys of the printing mechanism. This general understanding of the machine is desirable for the reason that the showing thereof in connection with the present disclosure is more or less fragmentary, though sufficient to be clearly understood by one skilled in this art.

In the drawings, 1 indicates the carriage of an Elliott-Fisher machine propelled and controlled in the usual way and supporting printing mechanism which includes type bars 2 and printing keys 3 (see Figs. 10 and 5), the keys shown being numeral keys but operating, so far as the printing mechanism is concerned, in a manner precisely similar to the letter keys and printing devices. One or all of the type bars 2 is equipped with a swinging type head 4, having dissimilar type $4^a$ and $4^b$, which may either be distinct throughout the series, as for instance upper and lower case, as usual, or, in a particular instance, may bear debit and credit designations. The heads 4 are equipped with tripping fingers 5, which engage a trip or trip ring 6, provided the latter is in its depressed position. Normally, however, the trip ring occupies an elevated position, as indicated in dotted lines in Fig. 10, so that the type heads are not shifted during the excursion of the bar to the platen. As usual, the trip ring 6 is supported at the end of an arm 7, projecting from a rock shaft 8, which is ordinarily rocked by the case key to depress the ring 6 to operative position when it is desired to shift the head 4 to cause the type $4^b$ to print.

Also, in this class of machines, a ribbon vibrator 9 is operated from the printing keys to present the ribbon 10 opposite the printing point of the machine. This end is attained through the medium of a vibrator lever 11, shown in Fig. 11, and suitable connections between the lever and the keys, as fully shown in my Patent No. 1,286,573, Dec. 3, 1918. The only element of this connection which it has been deemed necessary to show for the purpose of this disclosure is a pin 12 located in a slot 13 in the lever 11 and adapted to be shifted toward or from the fulcrum 14 of the lever 11 by a slide 15. Obviously, the location of the pin 12 relative to the fulcrum 14 will determine the throw of the vibrator 9, assuming that the motion is transmitted to the lever 11 from said pin. This will be undersood with reference to Fig. 11, wherein the location of the pin is such that a maximum throw of the ribbon will be effected to bring the red strip thereof to the printing point, as for instance, for the printing of credit items.

It will now be seen that the longitudinal shifting of the slide 15 will determine or select the color in which the record will be printed and that the dropping of the trip ring 6 will determine the particular type, $4^a$ or $4^b$, to be presented in printing position. Thus, through these instrumentalities both the color and type selection may be secured.

The mechanism as thus far described is well known, but in accordance with the present invention the automatic selection of both the color and character of the printed record is contemplated. To effect this end it is merely necessary to provide means which will come into action at a predetermined point of the movement of the carriage to shift the slide 15 of the ribbon mechanism and to drop the ring 6 of the case shift. To accomplish these ends I extend rearwardly from the shaft 8 an arm 16 projected back of the carriage casing and connected to one end of a controlling lever 17, fulcrumed at 18 on a part movable with the carriage and provided at its end with a roller 19 which, at a predetermined point in the carriage movement, engages a cam block 20, adjustably fixed to what is known as a control bar 21, carried by the line space frame. When the roller 19 contacts with the block 20, the front end of the lever 17 is depressed, thus elevating the arm 16 against the resistance of a spring 22 and rocking the shaft 8 to depress the trip ring 6 to the position shown in Fig. 10 and to oscillate an arm 23 extended rearwardly from the shaft 8 and connected by a link 24 to the rear end of a slide shifting arm 25 fulcrumed at 26 and attached at its front end to the slide 15, which, as we have seen, determines the particular color stripe of the ribbon to be presented at the printing point when the printing mechanism is operated.

In Figs. 9, 10 and 11, the roller 19 is shown depressed and the trip ring 6 has therefore been dropped and the slide 15 has been moved to a position to present the red stripe of the ribbon in printing position, when the ribbon is vibrated.

It is also usual in the machine under discussion to provide a swinging stop plate 27, which coacts with the ribbon vibrating mechanism to limit the movement of the vibrator. This stop member 27 is clearly shown in Fig. 9 coacting with a pin 28 on a lever 29, which latter is vibrated by the lever 11, shown in Fig. 11, and also clearly shown in my patent aforesaid. This stop member is mounted at the lower end of a shaft 30, at the upper end of which is a crank 31, which in accordance with my present invention is designed to be automatically operated to position the stop member 27 when the slide 15 is shifted automatically to determine the degree of vibration. This end is attained by connecting the crank 31 by means of a link 32 (see Figs. 9 and 11) to a short arm 33 movable with the shaft 8. Thus, when the shaft is rocked to drop the trip ring and to shift the ribbon selecting slide 15, the shaft 30 will be rotated against the resistance of a spring 34 to position the stop 27.

It is also desirable to direct the attention of the operator to the operative condition of the machine in order that he may with certainty determine at all times whether or not the machine condition corresponds to the requirements of the work to be done.

Pivotally mounted on a stud 35 is a lever 36, having a long forwardly extending arm 37 connected by a vertically disposed rod 38 with a sliding indicator 39 mounted in a turret 40. In the turret 40 is a sight opening 41, through which spaced indications on the indicator 39 are exhibited. These indications may vary, but indicated at the sight opening with the parts positioned, as in Fig. 11, is the word "Credit," because the ribbon has been set for the use of the red stripe, which is ordinarily the color used for printing credit items. When the indicator 39 is moved up to the next position another indicator, usually signifying a condition which will result in a black record, is shown at the sight opening. This may be debit, total or some other characteristic record ordinarily printed in black, still, further movement of the slide exhibits another indicator, as for instance, the word "Write," signifying that the mechanism is set for writing without adding. The lever 36 also has a short depending arm 42, having a pin 43, which engages a slot 44, in the end of a link 45, pivoted to a short arm 46 extended from the shaft 8. A second short arm 47 projects rearwardly from the fulcrum of the lever 36 and is provided with a pin 48 adapted to be engaged by a cam 49. The arm 47 also serves as a point of attachment for a spring 50, the tendency of which is to retract the lever 36 and the indicator 39 to the position shown in Fig. 11. Normally, that is to say, when the roller 19 is not in engagement with the cam block 20, the indicator will occupy the middle position, with the debit designation opposite the sight opening and the arm 42 of the lever 36 at the rearward limit of its movement. When, however, the roller engages the cam and is moved downward to select the type to be printed and the color, the raising of the arm 16 and the rocking of the shaft 8 will move the link 45 rearwardly, thus permitting the spring 50 to swing the lever 36 and the indicator 39 to the lowermost or credit position of the indicator, thus signifying that by the dropping of the trip ring 6 and the shifting of the slide 15 the machine has been organized for the printing of a character appropriate to a credit item, in the appropriate color, red.

As soon as the roller 19 passes from under the block 20, the slide 15, trip ring 6 and indicator 39 will be returned to the positions from which they were moved upon the engagement of the control cam by the roller 19.

It has already been stated that the machine sought to be improved by this invention comprehends in its organization an adding mechanism. It will now be necessary to explain a little further some of the characteristics of this adding mechanism and their relation to the carriage and the mechanism carried thereby.

In Fig. 11 is shown diagrammatically an adding device or register 51, having number wheels 52, occupying different denominational positions and arranged to be engaged and operated by a master wheel 53. The master wheel is mounted on and laterally movable with the carriage 1 to effect the denominational selection of the number wheels as the carriage moves to different denominational positions, as hereinbefore referred to. The master wheel is operated from the keys 3 by intermediate mechanism, which need not be specifically described, except to point out that the actuating mechanism includes a series of actuator levers 54, which may or may not be equipped with what are termed non-print keys 55, but are provided each with a pendant key connecting link 56, mounted to swing into and out of position to present pins 57, carried by the links, into and out of position to be engaged by hooks 58 with which the numeral key levers 59 are provided. The links 56 are formed with longitudinal slots 60 for the reception of pins 61, extended from arms 62, fixed to move with a rock shaft 63, which may be termed the key connecting rocker.

It will be seen that by the rocking of the shaft 63, the actuating mechanism may be connected or disconnected from the numeral keys of the machine. Normally, said numeral keys are disconnected from the adding mechanism in order to avoid the burdening of the printing mechanism with the operation of any of the actuating connections when printing without adding is to be accomplished, as for instance, between columns of numbers to be added or while printing columns of numbers which do not require addition. In order to connect the keys 3 with the actuating mechanism when the carriage reaches a column to be added, what is known as key connecting mechanism is ordinarily employed. This key connecting mechanism includes what is known as a depressor plate 64, ordinarily secured to the bottom of the register 51, to depress a key connecting arm 65, mounted to swing at the back of the carriage and having a cam 66 which rides under the depressor plate 64 to swing the arm 65 downward, (see Figs. 6 and 6ᵃ).

The tail piece 67 of the arm 65 engages a projection 68 on a lever 69 connected to the rear extremity of a lever 70, fulcrumed at 71 (see Fig. 8ᴬ) and having pivoted at its front end a hook 72 which engages a pin 73, projecting from an arm 74 on the shaft 63. When the key connecting arm 65 is depressed by passing under the depressor plate 64, the lever 70 will be oscillated to raise the hook 72 and to swing the arm 74, which serves to throw the key connecting rocker and links 56 forward and into the key connecting relation with the hooks 58 on the key levers 59. As soon as the cam 66 rides out from under the depressor plate 64, the key connecting rocker and links are returned to normal position by retracting springs 75. Obviously, this automatic connection of the keys depends upon the location of the hook 72 in position to engage the pin 73. I therefore provide for setting the key connecting mechanism in operative or inoperative position by moving the hook 72 into or out of its effective position. This is accomplished by connecting the hook 72 to a link 76, connected at its opposite end to an arm 77, at one end of a crank shaft 78, extend to one end of the carriage and having a crank arm 79, whose pin 80 is received in the bifurcated end of an arm 81 mounted to swing from a fulcrum screw 82. On the screw 82 is also mounted a lever 83, having a slot 84 for the reception of a pin 85, projecting from the arm 81, this lever 83 being also formed with the cam 49 which has heretofore been referred to as coacting with the pin 48 on the lever 46.

To the upper end of the lever 83 is pivotally connected the rear end of what may be termed a control slide 86, having at its front end a control key 87 and provided in its under edge with three notches 88, 89 and 90, which are engaged by the edge of the casing to retain the slide 86 in any one of three positions. With the control slide in the notch 88, that is to say, with the slide pushed in to the limit of its movement, the hook 72 of the key connecting mechanism is set in its operative position, as shown in Fig. 1. In this position of the control device the adding mechanism, while not connected to the numeral keys, is set for such connection by the key connecting mechanism when the key connecting arms 65 is swung down by the depressor plate. When this action occurs, the adding mechanism and keys are connected, as shown in Fig. 6. If now, the machine passes out of the register, having completed a debit computation in black, the release of the cam 66 from the depressor plate 64 will allow the springs 75 to disconnect the keys. If now, the machine moves into another register appropriated, let us say to credits, the keys will be again connected up to the adding mechanism in precisely the manner just described but the roller 19 will also engage a control block 20 so as to set the ribbon mechanism and the type shift for the printing of distinguishable credit characters in red, instead of black, as the credit items are accumulated in the credit register. We have already seen that when this automatic selection takes place the indicator 39 will be shifted to show that the machine is set for debit printing.

To set the hook 72 in its inoperative position so that the adding mechanism will not be connected up when the machine arrives opposite a register, a condition which permits the printing of a total at the foot of the column without disturbing the register, the control slide 86 is drawn outward, the distance of one notch, as indicated in Fig. 2. This will result in the swinging of the lever 83 to the position shown in Fig. 2, thus allowing the spring 91 to draw the arm 81 forward, thus rocking the shaft 78 and, through the medium of the link 76, moving the hook 72 out of cooperative relation with the pin 73 and thus, so to speak, unsetting the key connecting mechanism. If now the machine moves opposite a register, the depression of the key connecting arm 65 will merely result in the swinging of the lever 70 to elevate the rear end thereof and the hook 72, which latter, however, will not engage the pin 73 to operate the rocker for the purpose of throwing the links 56 to their engaged positions.

In this second position of the slide 86, that is to say, with the notch 89 engaged, the proper positioning of the indicator 36 is insured by the cooperation between the cam 49, the pin 48 and the spring 50. If now, it is desired to use the machine as a writing machine entirely independent of the adding mechanism, this may be done by pulling the control slide to its extreme outward position, as indicated in Fig. 3. This movement of the slide has no effect on the setting device of the key connecting mechanism which will remain disconnected. This is for the reason that during this last movement of the slide the arm 81 remains in the position to which it has been moved, but the lever 83 may be permitted a further movement with the slide, by reason of the slot and pin connection 84 and 85.

This further movement of the lever 83 accomplishes two purposes, first, it moves the cam 49 to insure the proper positioning of the indicator 36, which may now display the word "Write," for instance, indicating that the machine is organized for writing, as distinguished from writing and adding. Second, this movement of the lever accomplishes the unsetting or throwing out of action of a mechanism common to these machines and known as the decimal space trip. This decimal space trip mechanism is clearly shown in Figs. 7 and 7^A and 7^B and its purpose is to automatically effect an exaggerated or double spacing of the machine over the decimal space so that when the digit is printed in the units position and accumulated in the units wheel of the register, it will be unnecessary to operate the space bar for the purpose of spacing the machine past the decimal point. Instead of this extra operation the decimal space trip mechanism retards an escapement dog sufficiently to allow the machine to skip directly from the units of dollars position to the denominational position of the tens of cents. On the bottom of the register is a V-shaped decimal space trip 93, with which is adapted to coact a trip lever 94, which through intermediate connections 95, unnecessary to be described in detail, coacts with a retarding device 96 for an escapement dog 97, the action being such that the dog will be retarded just sufficiently to permit the passing of an extra tooth of the escapement and to arrest the carriage two steps instead of one step in advance of its last position.

It will be noted, by reference to Fig. 7^B, that the connections between the lever 94 and the escapement includes a rock shaft 98, at the end of which the lever is secured. To permit this mechanism to be put out of action or unset, this shaft 98 is so mounted as to be capable of limited longitudinal movement intended to shift the arm 94 for the purpose of bringing the same into or out of coincidence or cooperating relation with the tooth 93. It will therefore be seen that in order to entirely disassociate the writing and adding mechanisms it is desirable to effect this unsetting or release of the decimal space trip mechanism and this end is easily attained by connecting one arm 99 of a crank shaft 100 with a bracket 101, associated with the shaft 98 in such a manner that when the crank shaft 100 is rocked, the shaft 98 will move longitudinally to present the arm 94 in or out of operative position.

By again referring to Fig. 3, it will be seen that an arm 102, at the other end of the crank shaft 100, is connected by link 103 with the lever 83. The connection between the link and lever is a slot and pin connection 104, intended to permit the lever 83 to move independently of the link as the slide 86 is shifted from the first to the second position, (see Fig. 2) but the lost motion having been then absorbed the final movement of the slide 86 to its extreme outward position, shown in Fig. 3, will impart additional movement to the lever 83, to draw forward the link 103 and thus rock the crank shaft 100 to withdraw the decimal trip arm to an inoperative position.

It will thus be seen that the various objects of the invention have been attained and that by a combination of manual and automatic operations the machine is easily organized for the particular work to be performed and that each reorganization of the mechanism to accomplish a given purpose is automatically indicated to the operator.

What I claim is:—

1. In a machine of the class described, the combination with printing mechanism, including keys, adding mechanism, automatic key connecting mechanism and automatic decimal trip mechanism, of a controlling member movable to different positions to determine whether or not the key connecting mechanism and decimal trip mechanism shall operate, and an indicator movable to different positions to indicate the conditions of operation.

2. In a machine of the class described, the combination of printing mechanism including keys, and an adding mechanism adapted to be connected to and disconnected from the keys, of key connecting mechanism automatically operative to connect the keys and adding mechanism, a decimal spacing mechanism, a controlling device movable to one position to prevent the operation of the key connecting mechanism while permitting the operation of the decimal spacing mechanism and movable to another position to prevent the operation of both the key connecting and decimal spacing mechanisms, and an indicator operated by the controlling member to indicate the operative condition of the machine.

3. In a machine of the class described, the combination with printing mechanism including keys, adding mechanism, key connecting mechanism automatically operative to connect the keys and adding mechanism, and decimal spacing mechanism, of controlling mechanism including a controlling member movable to assume any one of three positions, in one of which both the key connecting mechanism and the decimal spacing mechanism will be operative to connect the keys and adding mechanism and to space the machine over the decimal point for the usual adding operation, in another of which the key connecting mechanism will be inoperative but the decimal spacing mechanism operative for the printing of totals with automatic spacing but without adding, and in the third position of which both the key connecting mechanism and the decimal spacing mechanism will be inoperative to secure the complete independence of the printing mechanism for ordinary writing.

4. In a machine of the class described, the combination with printing mechanism including keys, adding mechanism key connecting mechanism automatically operative to connect the keys and adding mechanism, and decimal spacing mechanism, of controlling mechanism including a controlling member movable to assume any one of three positions, in one of which both the key connecting mechanism and the decimal spacing mechanism will be operative to connect the keys and adding mechanism and to space the machine over the decimal point for the usual adding operation, in another of which the key connecting mechanism will be inoperative but the decimal spacing mechanism operative for the printing of totals with automatic spacing but without adding, and in the third position of which both the key connecting mechanism and the decimal spacing mechanism will be inoperative, to secure the complete independence of the printing mechanism for ordinary writing, and an indicator operated by the controlling mechanism to indicate the operative condition of the machine.

5. In a machine of the class described, the combination with printing mechanism including keys, adding mechanism, automatically operating key connecting mechanism for connecting the adding mechanism and keys, automatic decimal spacing mechanism, and an indicator movable to different positions to indicate the operative condition of the machine, of a controlling mechanism arranged to control the operation of the key connecting and decimal spacing mechanisms and the indicator, and an automatically operative ribbon selecting mechanism also arranged to operate the indicator.

6. In a machine of the class described, the combination with printing mechanism including keys, adding mechanism, automatically operating key connecting mechanism for connecting the adding mechanism and keys, automatic decimal spacing mechanism, an indicator movable to different positions to indicate the operative condition of the machine, of a controlling mechanism arranged to control the operation of the key connecting and decimal spacing mechanisms and the indicator, and an automatically operated type selecting mechanism also arranged to operate the indicator.

7. In a machine of the class described, the combination with printing mechanism including keys, adding mechanism, automatically operating key connecting mechanism for connecting the adding mechanism and keys, automatic decimal spacing mechanism, and an indicator movable to different positions to indicate the operative condition of the machine, of a controlling mechanism arranged to control the operation of the key connecting and decimal spacing mechanisms and the indicator, and automatically operative selective mechanism for determining the color and character of the printed record.

8. In a machine of the class described, the combination with printing mechanism including keys, adding mechanism, automatically operating keys connecting mechanism for connecting the adding mechanism and keys, automatic decimal spacing mechanism, and an indicator movable to different positions to indicate the operative condition of the machine, of a controlling mechanism arranged to control the operation of the key connecting and decimal spacing mechanisms and the indicator and automatically operative selective mechanism for determining the color and character of the printed record, said selecting mechanism being also operatively related to the indicator.

9. In a machine of the class described, the combination with printing mechanism including keys, adding mechanism, automatically operating key connecting mechanism for connecting the adding mechanism and keys, automatic decimal spacing mechanism and an indicator movable to different positions to indicate the operative condition of the machine, of a controlling mechanism arranged to control the operation of the key connecting and decimal spacing mechanisms and the indicator and an automatically operative ribbon selecting mechanism cooperatively related to the indicator.

10. In a machine of the class described, the combination with printing mechanism including keys, adding mechanism, automatically operating key connecting mechanism for connecting the adding mechanism and keys, automatic decimal spacing mechanism, and an indicator movable to different positions to indicate the operative condition of the machine, of a controlling mechanism arranged to control the operation of the key connecting and decimal spacing mechanisms and the indicator, and an automatically operated type selecting mechanism.

In testimony whereof I hereunto affix my signature in the presence of two witnesses.

HARRY ARTHUR FOOTHORAP.

Witnesses:
J. AZALEA WIGFIELD,
MARSHALL H. DEANE.